W. P. MUNCY.
TOWING DEVICE.
APPLICATION FILED OCT. 21, 1918.
1,303,104.
Patented May 6, 1919.
2 SHEETS—SHEET 2.
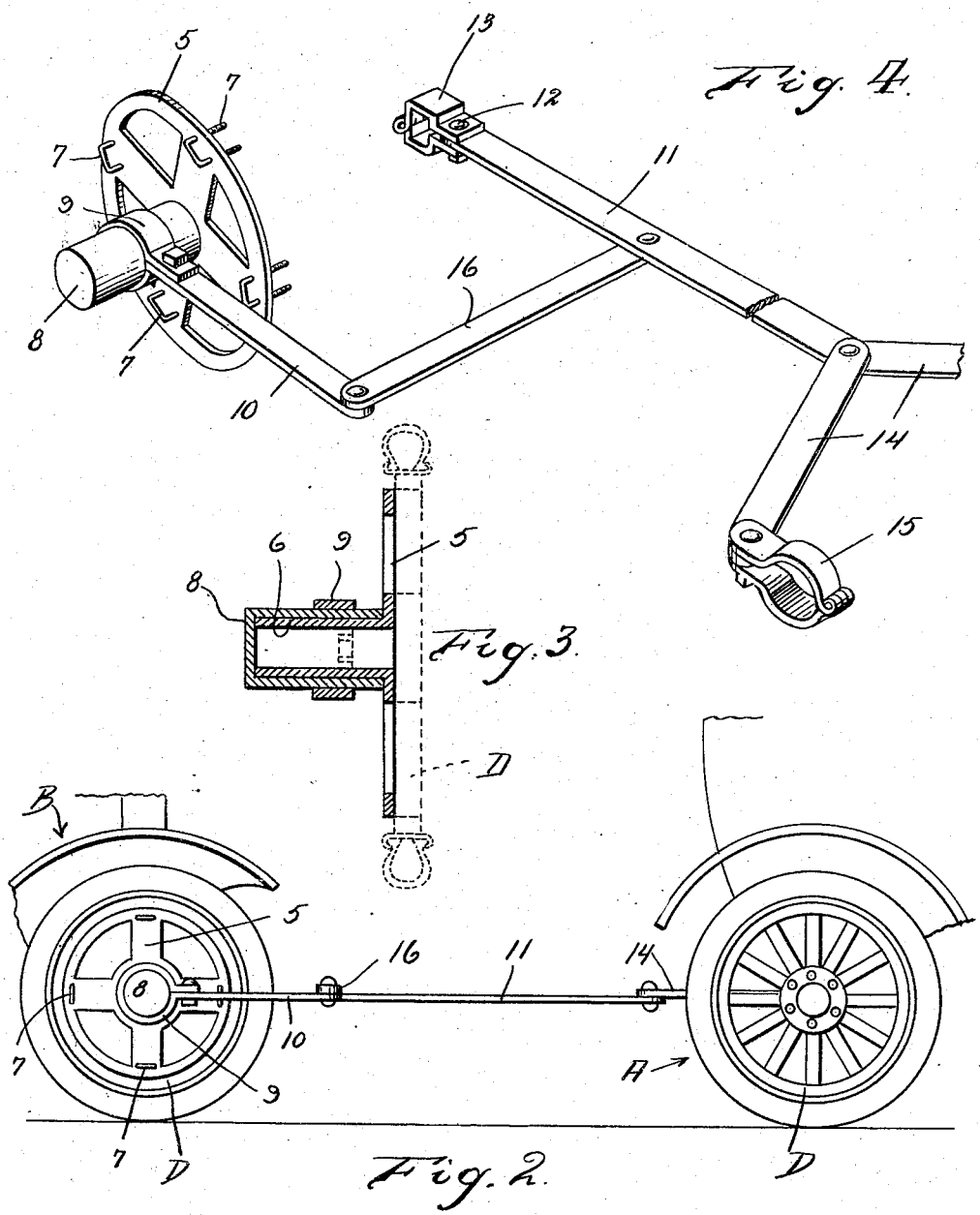

UNITED STATES PATENT OFFICE.

WINFRED P. MUNCY, OF DOYLE, CALIFORNIA.

TOWING DEVICE.

1,303,104.      Specification of Letters Patent.      Patented May 6, 1919.

Application filed October 21, 1918. Serial No. 259,081.

*To all whom it may concern:*

Be it known that I, WINFRED P. MUNCY, a citizen of the United States, residing at Doyle, in the county of Lassen and State of California, have invented new and useful Improvements in Towing Devices, of which the following is a specification.

This invention relates to draft devices, particularly to draft devices for motor vehicles, and has for its object the provision of a connecting device between two automobiles whereby the vehicle being towed will be automatically steered by movements of the towing vehicle so that the necessity of a driver within the vehicle being towed will be avoided.

An important object is the provision of a device of this character including a coupling member adapted for connection with two automobiles and having suitably connected therewith a guiding member which is detachably engageable upon one of the forward wheels of the automobile being towed whereby movement of the coupling member during turning movement of the vehicle doing the towing will automatically move the wheel to which the guiding device is connected so that the towed vehicle will be positively and correctly steered in accordance with the movement of the towing vehicle.

Another object is the provision of a device of this character which will be extremely simple and inexpensive in manufacture, highly efficient in use, easily applied and removed, durable in service and a general improvement of the art.

With the above and other objects and advantages in view, the invention consists in the details of construction to be hereinafter more fully described and claimed, and illustrated in the accompanying drawings in which:

Fig. 2 is a side elevation.

Fig. 3 is a detail sectional view through the wheel engaging member and

Fig. 4 is a perspective view of my device detached.

Figure 1:
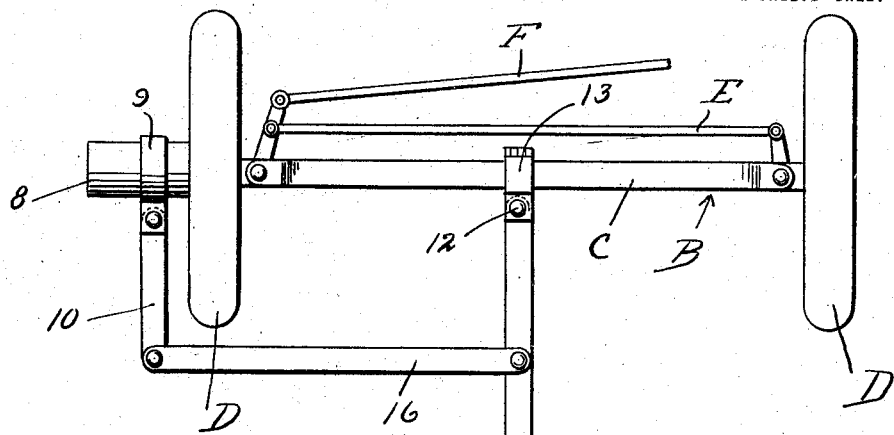
Figure 1 is a plan view of the front and rear portions of the chassis of two automobiles and showing my device applied.
Figure 1:
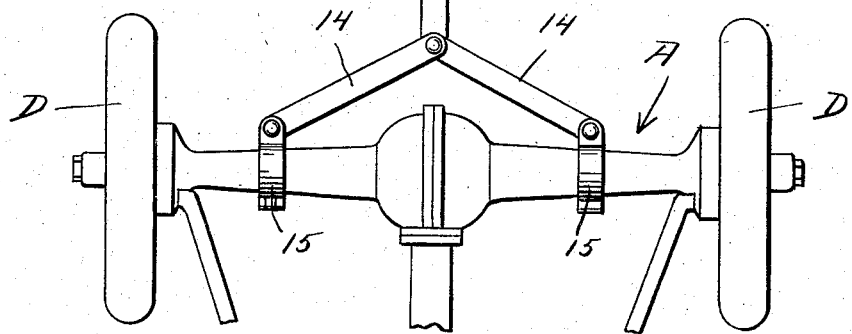

Referring more particularly to the drawings, the letters A and B designate respectively the rear and front portions of the chassis of two automobiles, the former towing and the latter being towed. The chassis B includes the usual axle C and wheels D. In accordance with the usual and well known construction, the wheels D are mounted upon spindles provided with arms connected by a rod whereby the wheels are simultaneously moved by movement of the steering rod F.

In carrying out my invention I provide a skeleton wheel 5 from one side of which extends a hub 6 having an internal diameter sufficient to be positioned over the hub cap of either of the wheels D. The skeleton wheel 5 is adapted to be placed against the spokes of a wheel D and is provided with a plurality of spoke encircling clips 7 whereby it may be secured in place upon the wheel D. Disposed upon the hub 6 and rotatable in respect thereto is a sleeve 8 which is encircled by a clamping member 9 from which extends an arm 10 which is of sufficient length that its end will extend beyond the tire carried by the wheel D.

The coupling bar between the two automobiles is designated by the numeral 11 and comprises a straight bar pivotally connected at one end, as shown at 12, to a clip 13 clamped upon the front axle 6 of the vehicle being towed.

At its forward end, the coupling bar 11 has pivotally connected therewith a pair of divergently disposed links 14 which are suitably connected by clips 15 with some convenient portion of the chassis of the towing automobile. A link 16 is pivotally connected with the forward end of the arm 10 and is pivotally connected with the coupling bar 11 at a point intermediate the ends thereof.

When the parts are connected as above described, turning movement of the towing vehicle A will result in corresponding pivotal movement of the coupling bar 11 upon its pivot 12. As the arm 10 extending from the bearing hub of the skeleton wheel is parallel with the coupling bar 11 and connected therewith by the links 16, the arm 10 and consequently the bearing sleeve 8 will be correspondingly moved whereupon the wheel D will also be moved. In view of the fact that both wheels D are connected by the usual steering arm connecting rod E, the other wheel D will be correspondingly moved and the vehicle being towed will be automatically steered to agree with the turning movement of the vehicle which is towing.

From the foregoing description and a study of the drawings it will be apparent that I have thus provided a very simple device which may be readily connected with an automobile to be towed whereby the towed vehicle will be automatically steered to agree with the movements of the vehicle during the towing in order to avoid any necessity for the presence of a driver within the towed vehicle in order to control the same.

While I have shown and described the preferred embodiment of the invention, it will of course be readily understood that I reserve the right to make such changes in the form, construction and arrangement of parts as will not depart from the spirit of the invention nor the scope of the subjoined claims.

Having thus described my invention I claim:—

1. A towing device comprising a coupling bar adapted for pivotal connection with the rear portion and front axle respectively of towing and towed motor vehicles, a clamping member adapted for engagement upon one front wheel of the towed vehicle, a sleeve member extending outwardly from one side of said member and adapted for disposition over the hub cap of the associated wheel, a rigid arm connected with said sleeve member and extending forwardly of the towed vehicle beyond the periphery of the associated wheel, and a connecting link pivotally connected with the forward end of said arm and with said coupling bar.

2. A towing device of the character described comprising a coupling bar adapted for pivotal connection with the rear portion and front axle respectively of a towing and towed motor vehicle, a skeleton wheel of less diameter than the diameter of a forward wheel of the towed vehicle and adapted for clamping engagement upon the spokes of a wheel, a hub extending outwardly from one side of said skeleton wheel in encircling relation to the hub cap of the vehicle wheel, a bearing sleeve disposed upon said hub of the skeleton wheel and rotatable in respect thereto, a rigid arm connected with said sleeve and extending forwardly past the periphery of the wheel, and a link pivotally connected with the forward end of said arm and with said coupling bar.

3. In combination with a coupling bar pivotally connecting the front axle of a towed vehicle with the rear portion of a towing vehicle, a guiding member clamped upon one of the forward wheels of the towed vehicle and rotatable therewith, a hub member extending outwardly from said guide member, a sleeve member engaging upon said hub member and rotatable in respect thereto, a rigid arm extending forwardly from said sleeve member beyond the periphery of the vehicle wheel, and a link pivotally connected with the forward end of said arm and with said coupling bar.

4. A towing device comprising a coupling bar adapted for connection with the rear portion and front axle, respectively, of towing and towed motor vehicles, a clamping member adapted for engagement upon one front wheel of the towed vehicle, a rigid arm connected with said member and extending forwardly of the towed vehicle beyond the periphery of the wheel, and a connecting link pivotally connected with the forward end of said arm and with said coupling member.

5. A towing device comprising a coupling bar adapted for pivotal connection with the rear portion and front axle respectively, of a towing and towed motor vehicle, a clamping member engageable upon one front wheel of the towed vehicle, means carried by said clamping member for centering the same upon the wheel, a rigid arm connected with said member and extending forwardly and beyond the periphery of said wheel, and a connecting link pivotally connected with the forward end of said arm and with said coupling bar.

6. A towing device of the character described comprising a coupling bar adapted for pivotal connection with the rear portion and front axle, respectively, of a towed and towing motor vehicle, a clamping member engageable upon one front wheel of the towed vehicle, and locking means connecting said member with said coupling bar.

In testimony whereof I affix my signature.

WINFRED P. MUNCY.

Copies of this patent may be obtained for five cents each, by addressing the "Commissioner of Patents, Washington, D. C."